United States Patent
Niemann

(10) Patent No.: US 9,459,131 B2
(45) Date of Patent: Oct. 4, 2016

(54) FILLING LEVEL SENSOR WITH SEVERAL THERMOELEMENTS AND METHOD FOR MEASURING THE FILLING LEVEL

(71) Applicant: Hella KGaA Hueck & Co., Lippstadt (DE)

(72) Inventor: Thomas Niemann, Delmenhorst (DE)

(73) Assignee: HELLA KGAA HUECK & CO., Lippstadt (DE)

( * ) Notice: Subject to any disclaimer, the term of this patent is extended or adjusted under 35 U.S.C. 154(b) by 152 days.

(21) Appl. No.: 14/466,772

(22) Filed: Aug. 22, 2014

(65) Prior Publication Data

US 2015/0052996 A1    Feb. 26, 2015

(30) Foreign Application Priority Data

Aug. 23, 2013   (DE) .................. 10 2013 014 100

(51) Int. Cl.
| | |
|---|---|
| *G01F 23/24* | (2006.01) |
| *F01M 11/00* | (2006.01) |
| *F01M 11/04* | (2006.01) |
| *G01F 23/00* | (2006.01) |
| *G01F 23/22* | (2006.01) |
| *F01M 11/12* | (2006.01) |
| *F16N 19/00* | (2006.01) |

(52) U.S. Cl.
CPC ........ *G01F 23/248* (2013.01); *F01M 11/0004* (2013.01); *F01M 11/0408* (2013.01); *F01M 11/12* (2013.01); *G01F 23/0007* (2013.01); *G01F 23/22* (2013.01); *G01F 23/246* (2013.01); *G01F 23/247* (2013.01); *F01M 2011/0416* (2013.01); *F01M 2011/0441* (2013.01); *F16N 19/003* (2013.01)

(58) Field of Classification Search
CPC .... G01F 23/22; G01F 23/0007; F01M 11/12
See application file for complete search history.

(56) References Cited

U.S. PATENT DOCUMENTS

| | | | | |
|---|---|---|---|---|
| 2,246,563 | A * | 6/1941 | Winters | G01F 23/247 122/451.1 |
| 3,280,627 | A | 10/1966 | Cousins et al. | |
| 3,372,310 | A * | 3/1968 | Kantor | H01L 23/5384 257/724 |
| 4,642,785 | A * | 2/1987 | Packard | G01K 13/002 374/102 |
| 2006/0025897 | A1* | 2/2006 | Shostak | B60C 23/005 701/1 |
| 2008/0016960 | A1* | 1/2008 | Zimmermann | G01F 23/22 73/295 |

FOREIGN PATENT DOCUMENTS

| | | |
|---|---|---|
| DE | 40 30 401 A1 | 9/1991 |
| DE | 100 60 007 A1 | 6/2002 |
| DE | 20 2004 009 874 U1 | 10/2004 |
| DE | 20 2006 002 674 U1 | 5/2006 |

* cited by examiner

*Primary Examiner* — Paul West
(74) *Attorney, Agent, or Firm* — Muncy, Geissler, Olds & Lowe, P.C.

(57) ABSTRACT

The aim is to achieve a particularly robust and reliable embodiment of a filling level sensor with several thermoelements for measuring the filling level of a liquid in a receptacle. This is achieved in that the thermoelements are arranged in parallel with one another and extend from the bottom upwards. The thermoelements are of different heights so that, depending on the filling level, one part of the thermoelements is flooded and another part is not. This can be used to derive information regarding the filling level.

12 Claims, 1 Drawing Sheet

Figure 1:
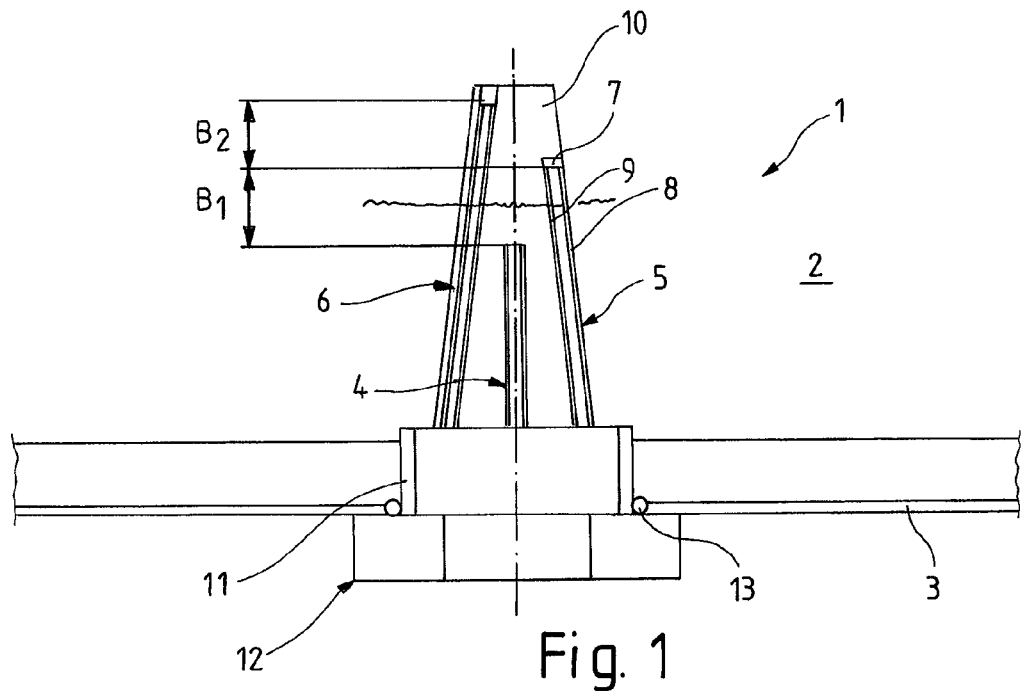

FILLING LEVEL SENSOR WITH SEVERAL THERMOELEMENTS AND METHOD FOR MEASURING THE FILLING LEVEL

The invention relates to a filling level sensor for measuring the filling level of a liquid in a receptacle, in particular for detecting the filling level of engine oil in an oil sump of a motor vehicle, with several thermoelements. Furthermore the invention relates to a receptacle for receiving a liquid, in particular an oil sump in a motor vehicle for receiving engine oil, and a method for measuring the filling level of a liquid.

A filling level sensor of this kind is for example known from the DE 20 2006 002 674 U1. The filling level sensor here serves to measure the filling level of a fuel in a fuel tank of a motor vehicle. The thermoelements are connected in series one behind the other and together form an elongated thermopile.

The invention is based on the requirement to propose a particularly simple and robustly constructed filling level sensor of the kind mentioned in the beginning. Furthermore the invention is based on the requirement to propose a receptacle for receiving a liquid, in particular an oil sump in a motor vehicle for receiving engine oil the liquid level of which can be measured in a particularly simple and reliable manner. Further, it is the aim of the invention to propose a method for measuring the filling level of a liquid in a receptacle with the above-mentioned filling level sensor.

With a filling level sensor for measuring a filling level of a liquid in a receptacle, in particular for detecting the filling level of liquids in a receptacle of a motor vehicle, with several thermoelements, provision is made according to the invention for the thermoelements to extend from the bottom upwards, to be of different heights and to be configured as thermoelectric generators. Using such a filling level sensor means that the filling level can be measured in a particularly simple and robust manner. Thermoelements which are completely immersed in the liquid can be detected particularly well. These produce the maximum voltage which is generated by the Seebeck effect. The thermoelements are arranged independently of one another and extend essentially vertically from the bottom upwards. "Essentially vertical" means that deviations from the vertical up to 30°, in particular up to 10°, are possible. In particular the thermoelements in the vicinity of the filling level sensor do not overlap and do not cross each other, and in particular are contactless. The aforesaid applies in particular in cases where the thermoelements are arranged in one plane. Even if the thermoelements cross each other due to protective layers and encasings, but are thermally and in particular electrically independent from one another, this still falls within the scope of the invention. Preferably all thermoelements are arranged on the bottom of the receptacle which serves as the "cold side". The thermoelements end at different heights, so that it can be determined based on the different heights whether a thermoelement is flooded or not. The measurement or the accuracy of the measurement therefore depends on the number of thermoelements and on the distance between the upper ends of the different thermoelements. Due to the fact that the thermoelements are configured as thermoelectric generators, there may be no need for an external energy supply. In this context use is made of the fact that when measuring a liquid which has a higher temperature than its environment, the thermoelements covered by the liquid comprise a temperature difference at their ends. Due to the Seebeck effect an electric voltage is just generated in these thermoelements which can be utilised not only for measuring but also for supplying energy to the filling level sensor. This means that the filling level sensor can be operated independently of external energy sources.

In a preferred arrangement of the invention the filling level sensor comprises a transmitting device for the wireless transmission of measured data. The transmitting device may for example comprise a radio device for transmitting the measured data. Various radio standards may be used. Because an autarkic energy supply via thermoelectric generators is proposed, there is no longer any need for cabled connections to the filling level sensor. This makes assembly of the filling level sensor considerably easier thus allowing savings in terms of time and costs.

The thermoelements preferably all lead down to the bottom of the receptacle where they have their contact point on the "cold side". The filling level sensor is particularly suitable for measuring the filling level of warm and hot liquids. In particular when measuring the filling level of engine oil, the filling level sensor can be used to particular advantage because here the temperature differences are particularly marked. The "cold side" may have temperatures in the region of 30° C., whilst at the opposite end, where the thermoelement is in the oil, the opposite end has a temperature of approx. 100° C., and when the oil level is low, i.e. when the upper end of the thermoelement is in air, the opposite end is approx. 60° C.

In a preferred arrangement of the invention the filling level sensor comprises a basic body on which the thermoelements are arranged. Preferably the thermoelements are arranged thereon in an essentially parallel manner, i.e. at angles of less than 30° C., preferably of less than 10° C. relative to each other. Preferably the basic body narrows somewhat towards the top so that the thermoelements arranged on it are not absolutely parallel to each other but are inclined towards each other at the said angles. In a preferred arrangement of the invention the thermoelements are arranged in parallel to each other. Preferably the thermoelements do not cross and in particular to not contact each other.

The thermoelements are imprinted onto the basic body. Furthermore it is favourable to provide indentations in the basic body, in which the thermoelements are received. The thermoelements may be imprinted into these indentations or inserted there in some other manner.

In another preferred arrangement of the invention the thermoelements are covered by a protective layer. One could also call it a sealing layer. When the thermoelements have been arranged in the indentations, the thickness of this protective layer is preferably sufficient to ensure that the protective layer finishes flush with the surface of the basic body. Preferably the protective layer has a thickness of at least 50% of the thickness of the thermoelement.

In a preferred arrangement of the invention the filling level sensor comprises at least five thermoelements of different heights. Especially preferably at least seven thermoelements, in particular at least nine, are provided.

In a preferred arrangement of the invention the filling level sensor comprises at least one energy storage device for the at least intermediate storage of electrical energy generated by the thermoelements. The energy storage device may for example be an accumulator or a capacitor. These are able to store the energy from the thermoelements which are then available for example for supplying energy to the transmitting device.

Furthermore the invention relates to a receptacle for receiving a liquid, in particular to an oil sump in a motor vehicle for holding engine oil, wherein the above-described filling level sensor is associated with the receptacle.

Preferably the receptacle comprises a draining element in the floor area. The oil sump thus is preferably configured as an oil draining screw. The filling level sensor is preferably arranged on the draining element. This makes assembling and dismantling of the filling level sensor particularly simple. The diameter of the filling level sensor is smaller than the diameter of the draining element.

Evaluation preferably takes the form of summing the voltage of all individual thermoelements and then using the total voltage thus obtained for directly deducting how many thermoelements are also flooded at their upper end. This allows to draw a conclusion as to the filling level. The measured voltage is set in correlation to a range of filling levels. The result is a voltage which rises as the filling level rises and which takes the form of a step function. This gives an indication of the range in which the filling level is, wherein the range is defined by the heights of two adjacent thermoelements, respectively.

In a further development of the method the electric voltage coming from the thermoelements is at least partially utilised for driving the filling level sensor. On the one hand, during measuring, the filling level is determined with the aid the thermoelements, whilst on the other the thermoelements are utilised as thermoelectric generators for generating energy (Seebeck effect). The energy generated can, for example, be used to drive the filling level sensor thereby permitting energy-autarkic operation. Utilisation of the thermoelements for energy generation is possible only with liquids which have a temperature higher than the temperature of their environment.

Overall this filling level sensor is a particularly favourable one, because it can be constructed in a particularly simple manner thereby permitting robust and low-cost measuring. The filling level sensor can be used for both static and dynamic measuring. The measuring tolerance is the same over the entire measuring range. Due to the possibility of imprinting the thermoelements and protecting the thermoelements by a protective layer, the sensor and all sensing areas are kept outside the medium. Also the sensor is comparatively insensitive against oblique installation. The measuring process itself is not affected by this. Measuring continues to be carried out in a manner which is slightly inaccurate due to the fact that the height of the thermoelements, due to their oblique positioning during installation, does not exactly correspond to the predicted position.

The invention will now be explained in detail by way of the embodiment shown in the drawing. In detail the schematic representations show, in FIG. 1: a schematic side view, in section, of a receptacle with a filling level sensor received therein; and, in FIG. 2: a cross-section through a filling level sensor according to the invention.

FIG. 1 shows a filling level sensor 1 which is arranged in a receptacle 2. This may, for example, be an oil sump in a motor vehicle. The filling level sensor comprises, in particular, a basic body 10 which has several thermoelements, preferably between five and ten thermoelements, arranged on it. In the embodiment shown three thermoelements 4, 5 and 6 are illustrated. Each thermoelement consists of a pair of thermoelements, with a conductor 8 made from a first metal and a conductor 9 made from a second metal. The two conductors 8 and 9 are connected with each other at two free ends. Shown here are the upper contact point 7 of the two conductors 8, 9 from the first metal and the second metal. This upper contact point 7 for each of the used thermoelements 4, 5 and 6 is at a different height. The lower contact points of the first conductor 8 and the second conductor 9 are not visible here because these are arranged in the area of a bottom 3 of the receptacle 2. Here they are arranged in a draining element 12 which holds the basic body 10. The basic body 10 in this embodiment is configured tapering slightly upwards. The individual thermoelements 4, 5 and 6 are electrically connected independently of each other. The thermoelements 4, 5 and 6 are essentially arranged in parallel, i.e. in the embodiment with the upwardly tapering basic body 10 they are angled towards each other at less than 30°, preferably at less than 10°. The thermoelements 4, 5 and 6 are arranged on the basic body 10 so as not to cross or overlap each other. The basic body 10 is arranged on the draining element 12. This draining element 12 may be configured as an oil draining screw. Here a thread 11 is indicated with which the draining element 12 is screwed into the bottom 3 of the receptacle 2. An annular seal 13 is provided with which the draining element 12 is sealed against the receptacle 2.

When there is no liquid in the receptacle 2, all contact points 7 are outside the liquid and the thermoelements 4, 5, 6 all show the same voltage, since the temperature difference between the contact point in the floor area and the upper contact point 7 is the same for all. As the liquid level rises and a difference occurs in the temperature between the liquid and the surrounding air, the output voltage of the thermoelement 4 changes as its contact point 7 is exceeded. In this way it can be determined that the filling level is within a range B1, i.e. between the contact point 7 of the first thermoelement 4 and the contact point 7 of the second thermoelement 5. As the filling level rises further and exceeds the height of the contact point 7 of the second thermoelement 5, it can be determined that the filling level is within the range B2. By using additional thermoelements the measuring range can be extended and/or the accuracy of the filling level measurement can be increased.

According to the invention measuring takes the form of adding up the voltages of individual thermoelements 4, 5 and 6. As each contact point 7 of the individual thermoelements is exceeded, the measured total voltage rises in stages or in steps. This rise is associated with a filling level within a certain range B.

Figure 2:
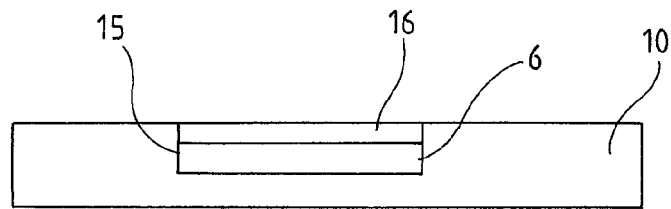

FIG. 2 shows a cross-section through the basic body 10, wherein only one thermoelement 6 is arranged in the area of this cross-section. An indentation 15 is provided in the basic body 10. This indentation 15 is the place where the thermoelement 6 is fitted, in particular imprinted on the bottom of the indentation 15. A protective layer 16 is placed onto the thermoelement 6. This protective layer 16 represents a seal. The basic body 10 preferably consists of plastic. The protective layer 16 also preferably consists of plastic, preferably of the same plastic as the basic body 10. The thickness of the thermoelement 6 is greater than the thickness of the protective layer 16. The thickness of the protective layer 16 however is greater than half the thickness of the thermoelement 6. The protective layer 16 finishes flush with the top side of the basic body 10.

All features in the above description and in the claims can be selectively combined at random with the features of the independent claim. The disclosure of the invention is therefore not limited to the described or claimed feature combinations, rather all feature combinations meaningful in terms of the invention are considered as having been disclosed.

The invention claimed is:

1. A filling level sensor for measuring a filling level of a liquid in a receptacle, the filling level sensor comprising:

a basic body;

several thermoelements disposed on the basic body; and a protective layer applied to the thermoelements, wherein the thermoelements extend upwards from a bottom of the receptacle and the thermoelements comprise different heights, wherein the thermoelements are configured as electric generators, and wherein the protective layer finishes flush with a surface of the basic body.

2. The filling level sensor according to claim 1, wherein the filling level sensor comprises a transmitting device for the wireless transmission of measured data.

3. The filling level sensor according to claim 1, wherein the thermoelements extend upwards from the bottom of the receptacle independently of each other.

4. The filling level sensor according to claim 1, wherein the thermoelements are imprinted on the basic body.

5. The filling level sensor according to claim 1, wherein the basic body comprises indentations in which the thermoelements are received.

6. The filling level sensor according to claim 1, wherein the protective layer has a thickness of at least 50% of a thickness of the thermoelement.

7. The filling level sensor according to claim 1, wherein the filling level sensor comprises at least five thermoelements of different heights.

8. The filling level sensor according to claim 1, wherein the filling level sensor comprises at least one energy storage device for the at least intermediate storage of the electric energy generated by the thermoelements.

9. A receptacle for receiving a liquid, wherein the receptacle comprises a filling level sensor according to claim 1.

10. The receptacle according to claim 9, wherein the receptacle comprises a draining element at the bottom of the receptacle and in that the filling level sensor is arranged on the draining element.

11. A method for measuring the filling level of a liquid in a receptacle with a filling level sensor, the filling level sensor comprising several thermoelements, wherein the thermoelements extend upwards from a bottom of the receptacle and the thermoelements comprise different heights and wherein the thermoelements are configured as electric generators, the method comprising:

measuring voltages of all of the thermoelements;

adding up the voltages of all the thermoelements; and setting a total voltage in correlation to a filling level range.

12. The method according to claim 11, wherein the electric voltage coming from the thermoelements is utilized at least partially for driving the filling level sensor.

* * * * *